Jan. 8, 1963  F. O. HENNIG  3,072,380
STATOR BLADE CARRIER ASSEMBLY MOUNTING
Filed Feb. 5, 1959  3 Sheets-Sheet 1

INVENTOR.
Fritz O. Hennig
BY Popp and Sommer
Attorneys.

INVENTOR.
Fritz O. Hennig
BY
Popp and Sommer
Attorneys

Jan. 8, 1963   F. O. HENNIG   3,072,380
STATOR BLADE CARRIER ASSEMBLY MOUNTING
Filed Feb. 5, 1959   3 Sheets-Sheet 3
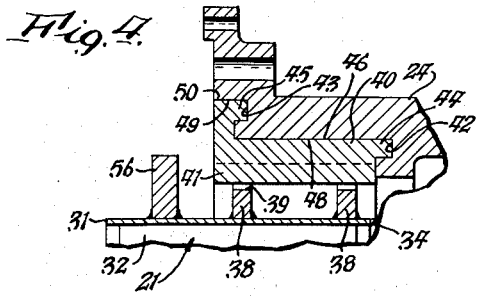
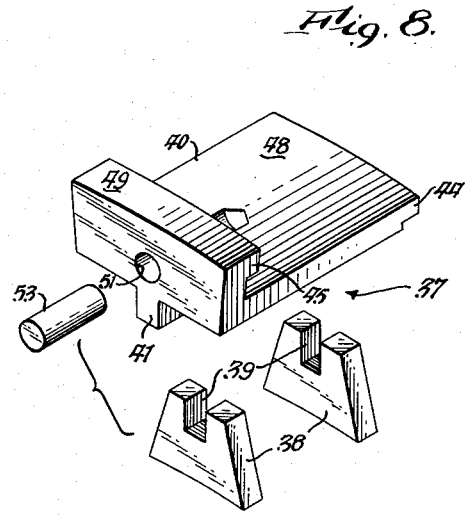
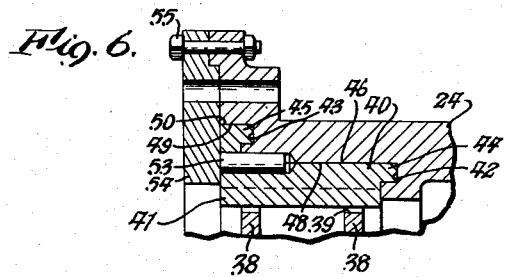
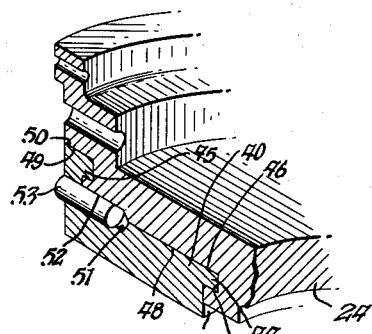
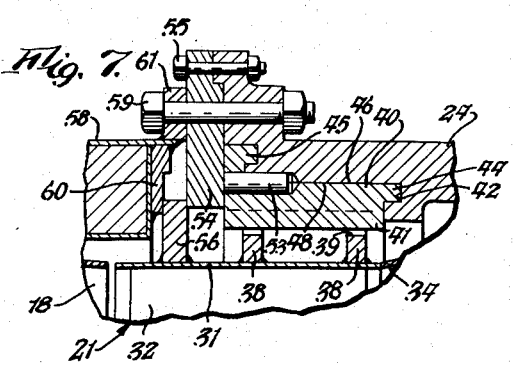
INVENTOR.
Fritz O. Hennig
BY Popp and Sommer
Attorneys.

United States Patent Office 3,072,380
Patented Jan. 8, 1963

3,072,380
STATOR BLADE CARRIER ASSEMBLY MOUNTING
Fritz O. Hennig, Olean, N.Y., assignor, by mesne assignments, to Dresser Industries, Inc., Dallas, Tex., a corporation of Delaware
Filed Feb. 5, 1959, Ser. No. 791,325
7 Claims. (Cl. 253—65)

This invention relates to improvements in gas turbines, and more particularly to an improved manner of mounting a stator blade carrier assembly in concentric relation to a turbine rotor.

In the construction of gas turbines, it is desirable to dispose stator blades in juxtaposition to the blades on the turbine rotor so that the gas flowing through the stator and rotor blades reacts to impart rotational motion to the rotor. In certain constructions of turbines, the stator blades are mounted on a carrier which also includes an annular ring which surrounds the rotor blades in closely spaced and concentric relation to the tips thereof. In order to achieve the aforementioned concentric relationship between the annular ring of the stator blade carrier assembly and the tips of the rotor blades, it was heretofore the practice to employ a fixture on the stator blade carrier assembly as well as another fixture on the annular support ring of the turbine frame to determine the location of key slots to be milled through both the assembly and ring so that such key slots would be in a perfectly opposed relation in order to receive keys without additional fitting at assembly. This practice was time consuming and expensive and further required a repetition of the same procedure including the use of fixtures when a different stator blade carrier assembly was substituted for its predecessor as required from time to time.

It is accordingly the principal object of the present invention to provide an improved means for mounting the stator blade carrier assembly on the turbine support ring which does not require the use of fixtures and which is quicker and easier, and hence less expensive than the practice heretofore followed. It also has the advantage of facilitating replacement of stator blade carrier assemblies.

Another object is to provide a mounting means for the stator blade carrier assembly which maintains the desired concentricity with the turbine rotor and yet allows for dimensional changes in the assembly induced by varying thermal conditions.

The invention comprises the features of construction, combination of elements and arrangement of parts, which will be exemplified in the construction hereinafter set forth and the scope of the invention will be indicated in the claims.

Other objects and advantages of the invention will be apparent from the following detailed description in which:

FIGS. 4–7 are views successively illustrating the relationship of certain parts of the novel mounting means forming the subject of the present invention during installation of the stator blade carrier assembly.

FIG. 8 is an exploded perspective view of the mounting means shown in FIGS. 4–7.

FIG. 9 is a perspective view of a section taken through a portion of the mounting means during an intermediate stage of installing the stator blade carrier assembly.

Figures 1, 2:
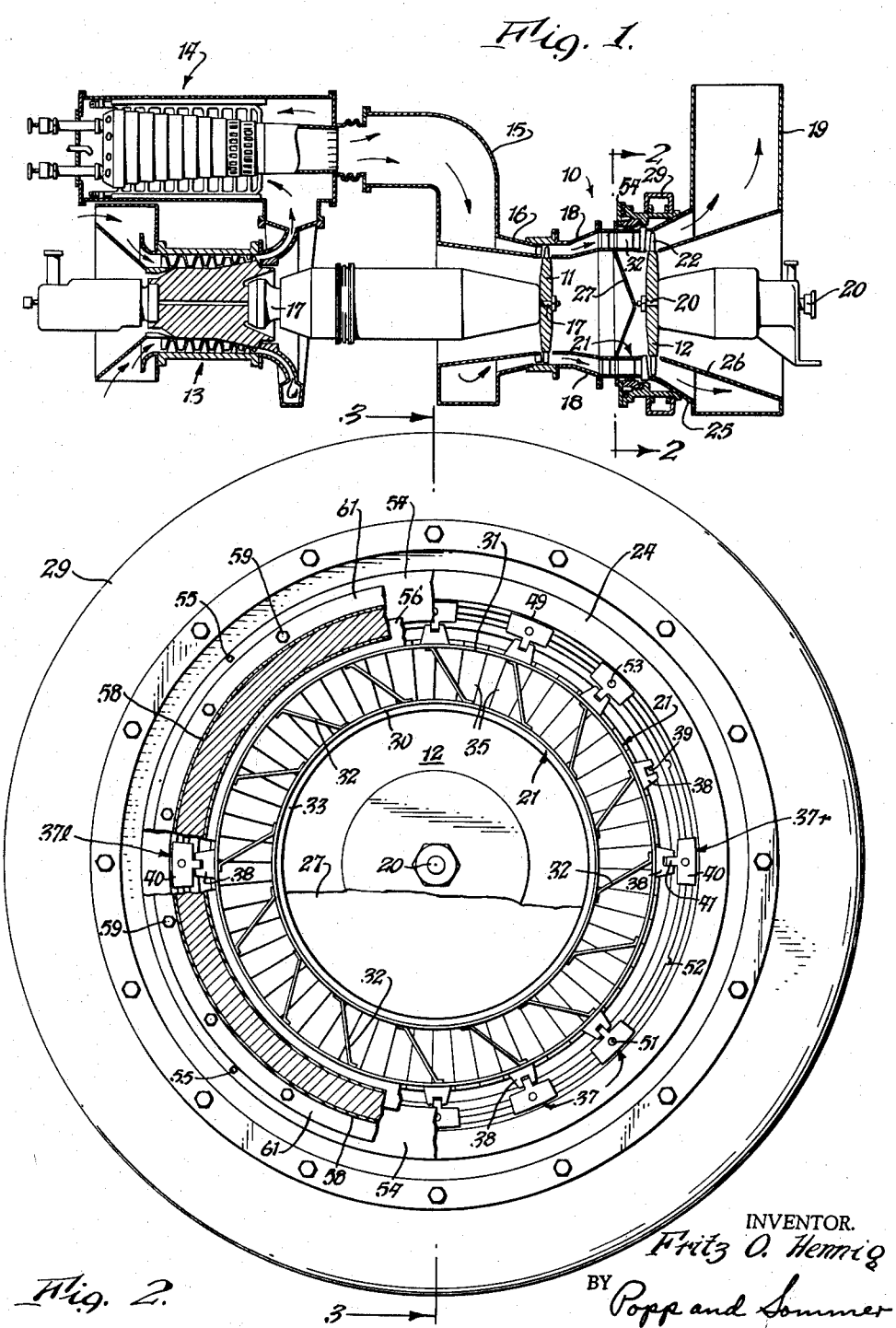
FIG. 1 is a generally vertical central longitudinal sectional view through a gas turbine embodying the present invention.
FIG. 2 is a vertical transverse sectional view thereof, on an enlarged scale, taken on line 2—2 of FIG. 1.

Referring to FIG. 1, the numeral 10 represents generally a two-stage gas turbine having a first stage bladed rotor 11 and a second stage bladed rotor 12. The first stage rotor 11 through appropriate shaft means 17 drives an axial flow compressor 13 which draws air in from the atmosphere, compresses it and discharges it into a combustor indicated generally at 14. The compressed air from the compressor 13 is mixed with fuel in the combustor 14 and ignited to provide hot and pressurized combustion gases which are led by a conduit 15 to the annular inlet duct 16 of the two-stage turbine 10. These gases flow through the first stage rotor 11 imparting rotational movement thereto. Upon leaving the first stage rotor 11, the gases pass through an annular intermediate duct indicated at 18, through the second stage rotor 12 and out an exhaust duct 19. The second stage rotor 12 is shown as being mounted on a shaft 20 which may be coupled to any equipment (not shown) for driving the same.

The gas turbine structure so far described is fully understood by those skilled in the art and a further explanatory elaboration is deemed unnecessary.

Figure 3:
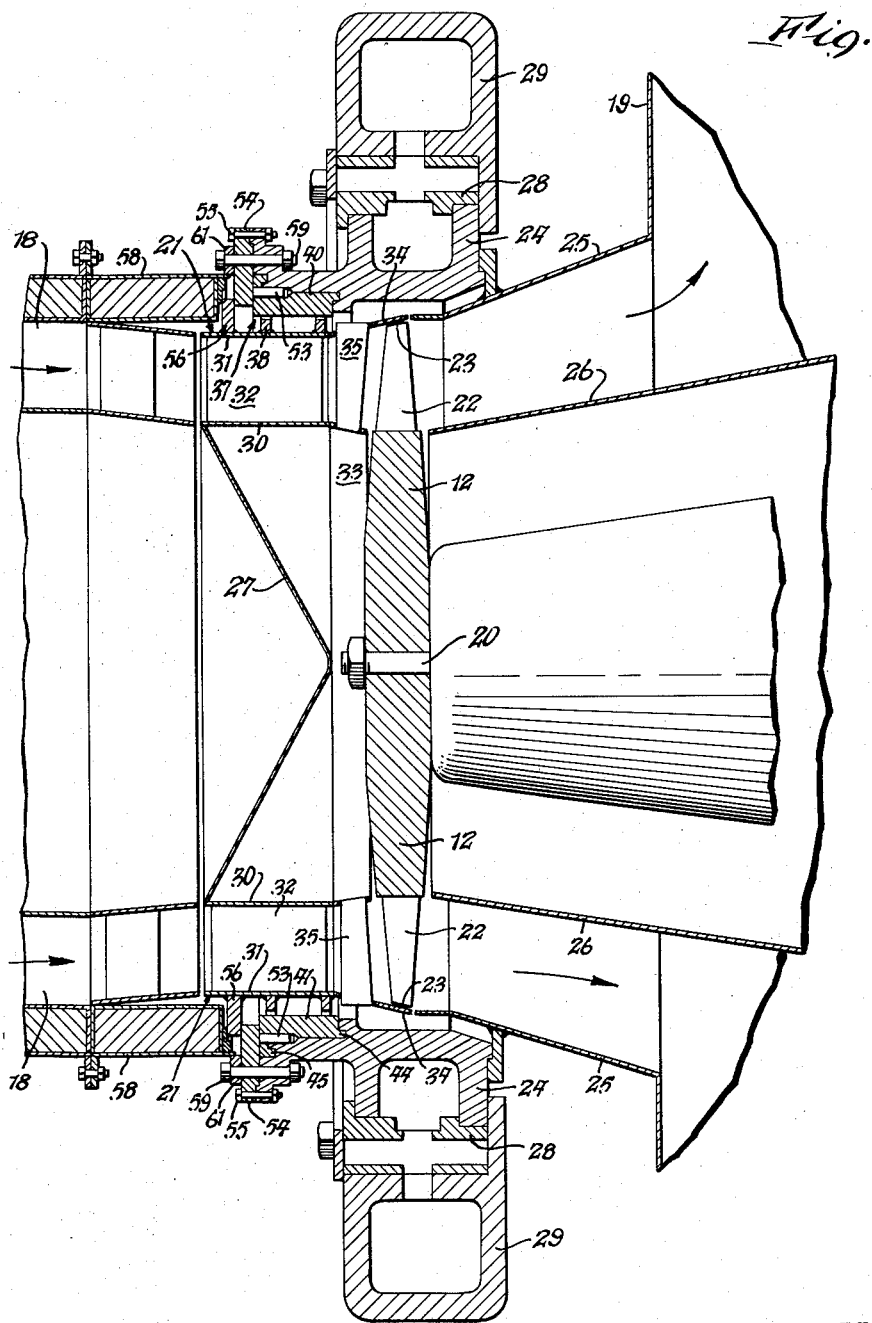
FIG. 3 is a vertical longitudinal sectional view thereof, on a still further enlarged scale, taken on line 3—3 of FIG. 2.

The invention is concerned with the means of mounting a stator blade carrier assembly indicated generally at 21 which is shown in FIGS. 1 and 3 as being arranged immediately adjacent the second turbine rotor on the upstream side thereof.

Referring to FIG. 3, the second stage rotor 12 is shown as having a series of radially outstanding and circumferentially spaced blades 22, each of which is shown as having a tip in the form of a straight edge 23. This edge 23 is illustrated as not being parallel to the axis of the rotor 12 but inclining radially outwardly from the upstream side toward the downstream side of the rotor. As part of the turbine frame, there is illustrated a stationary hot or inner ring 24 which surrounds the rotor 12 in spaced relation thereto and is shown as supporting a stationary outer exhaust ring 25 which has its upstream end disposed adjacent the downstream corner of the rotor blade tips 23. A stationary inner exhaust ring 26 arranged within the outer ring 25 and spaced therefrom has an upstream edge disposed adjacent the roots of the rotor blades 22. The annular space between the exhaust rings 25 and 26 provides a passage through which the gases passing the rotor 12 can be conducted to the exhaust stack 19.

Surrounding the hot ring 24 is an intermediate ring 28, in turn surrounded by a cold or outer ring 29. The various rings 24, 28 and 29 are suitably connected together in a manner which forms no part of the present invention but collectively may be regarded as a stationary ring member.

Referring to the stator blade carrier assembly 21, the same is shown as comprising an inner guide ring 30 surrounded by an outer guide ring 31 in spaced relation thereto. The inner guide ring 30 is supported on the outer guide ring 31 by a plurality of circumferentially spaced ribs or vanes 32, as best shown in FIG. 2. A conically-shaped shield 27 is shown in FIG. 3 as arranged within the inner ring 30. The upstream ends of the rings 30 and 31 of the stator blade carrier assembly are conterminous respectively with the inner and outer rings which form the duct 18 and through which the gases are guided to the blades 22 of the rotor 12. The downstream end portion 33 of the inner guide ring 30 is shown as being progressively contracted in a downstream direction so that its downstream edge is substantially adjacent the roots of the rotor blades 22 on the upstream side thereof. The outer guide ring 31 has an outwardly flared end ring portion 34, the downstream marginal portion of which surrounds the rotor blade tips 23 in closely spaced relation thereto. The downstream edge of the flared end ring portion 34 is also shown as being conterminous with the upstream edge of the outer exhaust ring 25. The various rings 30, 31, 33 and 34 are severally annular continuous members.

Between the inner and outer end rings 33 and 34, respectively, are arranged a series of radially disposed and circumferentially spaced stator blades 35. These blades 35 may be mounted on the end rings 33 and 34 in any suitable manner. Typically, slots of the appropriate contour are provided in the end rings 33 and 34, the stator blades 35 positioned therein and welded in place.

It is important that the downstream outer end ring 34 of the stator blade carrier assembly 21 be mounted in a position so that the inner surface of this end ring is not only closely spaced to the rotor blade tips 23 but concentric thereto. The present invention is concerned primarily with the means for mounting the stator blade carrier assembly solely on the ring member constituted by the assembly of hot, intermediate and cold rings, 24, 28 and 29, respectively. For this purpose and in accordance with the invention, a plurality of circumferentially spaced support means, indicated generally at 37, are operatively interposed between the stator blade carrier assembly 21 and the hot ring 24. Such support means include a guide means fast to the carrier assembly and another guide means fast to the hot ring 24, the two guide means cooperating in a manner to permit relative movement therebetween in a direction radial to the axis of the rotor 12.

The guide means of each support means 37 and fast to the carrier assembly are shown as comprising a pair of axially spaced and aligned guide blocks or lugs 38 arranged on the exterior of and preferably welded to the outer guide ring 31 of the carrier assembly. Of course, if desired, a single guide block or lug 38 may be used although two as shown are preferred.

Each guide block 38 is shown as provided with a radially outwardly opening, flat-sided slot or recess 39 having parallel side walls. The slots 39 in each companion pair of guide blocks 38 are axially aligned so that the corresponding side wall surfaces of such slots 39 are coplanar and parallel to a radial plane extending through the axis of the rotor 12.

Each of the guide means on the hot ring 24 and adapted to cooperate with a companion pair of guide blocks 38, comprise a key member 40 having a rib 41 which projects radially inwardly with respect to the axis of the rotor 12. The rib 41 extends longitudinally of such rotor axis and has a length sufficient to be received slidably in the aligned slots 39 of the corresponding pair of guide blocks 38. The side surfaces of the rib element 41 are parallel to each other and also parallel to the guide surfaces provided by the side walls of the slots 39. The width of the aligned slots 39 is a few thousandths of an inch greater than the width of the rib element 41 received therein. One such key member is provided for each pair of corresponding guide blocks 38. Thus the cooperating sets of ribbed key members 40 and slotted guide blocks 38 form male and female members.

An important feature of the present invention resides in the means of supporting each key member 40 on the hot ring 24 in a manner which permits the key member to be shifted initially in a circumferential direction while being held against movement relative to such hot ring in a direction radial to the axis of the rotor 22. For this purpose, the hot ring 24 is shown as being formed to provide a pair of axially and radially spaced, axially facing, annular grooves 42 and 43. Each key member 40 is formed with a pair of axially and radially spaced, axially projecting, tongues 44 and 45 received severally and slidably in the annular grooves 42 and 43, respectively. Between the grooves 42 and 43, the hot ring 24 is provided with an annular surface 46. The outer peripheral surface of the inner tongue 44 is a continuation of the surface 48 of the main body portion of the key member and has a curvature generated by a radius corresponding generally to that for the cylindrical surface 46 on the hot ring. Likewise, the outer peripheral surface 49 of the upstanding portion which forms the outer tongue 45 has a curvature the radius of which corresponds generally to that of an annular surface 50 provided on the hot ring 24 and surrounding the tongue 45. The inner surfaces of tongues 44 and 45 are concentric with their respective aforementioned outer surfaces. These tongues have approximately the same thicknesses in a radial direction as the widths of their respective grooves 42 and 43 so as to be slidable therein.

It will be seen that with the key members 40 mounted with their tongue elements 44 and 45 in the annular grooves 42 and 43 of the hot ring 24, such key members can be shifted circumferentially about the hot ring. When mounting the stator blade carrier assembly 21, it is first positioned adjacent the rotor 12 and its position adjusted so that the desired concentricity of its outer end ring 34 with respect to the axis of the rotor 12 is obtained. The carrier assembly is used as a locating fixture for the key members 40 which key members are free to be shifted circumferentially relative to the grooves in the hot ring. When the desired concentricity of the stator blade carrier assembly is obtained, the assembly is clamped or otherwise suitably held in position by means not shown for a purpose hereinafter explained.

Referring to FIG. 2, it will be seen that there are a pair of support means 37–*l* and 37–*r*, each including a key member 40 and a pair of guide blocks 38, located on diametrically opposite sides of the transverse horizontal centerline of the rotor 12. Such horizontal left and right support means 37–*l* and 37–*r*, respectively, are positioned so that there is zero clearance between the upwardly facing guide surface on the rib element of the key member and the downwardly facing side wall of the slots of the cooperating pair of guide blocks. When such zero clearance is achieved by shifting these key members against the guide blocks, these horizontally disposed key members are drilled to provide a hole 51, typically shown in FIG. 5, part of which hole is formed in the hot ring 24, as indicated at 52. FIG. 4 is a similar illustration of the parts involved but before drilling. Thereafter, a dowel pin 53 is inserted in the hole 51, as shown in FIG. 6, and this pin will secure the key member to the hot ring against circumferential movement relative thereto. After the horizontally disposed support means 37–*l* and 37–*r* have been first positioned with zero clearance as explained above, the balance of the key members are drilled and pinned in similar manner, except that approximately equal clearance is provided between the opposing guide surfaces of the rib elements of the key members and the opposing guide surfaces on the corresponding slotted guide blocks.

In order to prevent relative movement between the key members 40 and the hot ring 24 in a direction axial of the rotor axis, a retainer ring 54 is positioned against the exposed end faces of the key members 40 and the hot ring 24, as best shown in FIG. 6. The retainer ring 54 is shown as fastened to the hot ring 24 by a series of circumferentially spaced bolts 55 passing through registered horizontal holes provided in the ring 54 and the hot ring 24.

Referring to FIG. 7, the outer guide ring 31 of the stator blade carrier assembly 21 is shown as having secured thereto as by welding an outwardly projecting annular guide flange or ring 56. This flange 56 bears against the retainer ring 54 on the side thereof opposite from the key members 40. The outer wall structure of the intermediate duct 18 is shown as including an outer shell 58 having an annular end wall 60 and an outwardly extending annular attaching flange 61 both secured to the shell as by welding. The end wall 60 bears against the guide flange 56 on the side thereof opposite from the retainer ring 54. The attaching flange 61 bears against the exposed end face of the retainer ring 54 and is secured to the hot ring 24 by a series of circumferentially spaced bolts 59 passing through registered horizontal holes provided in the hot ring 24, retainer ring 54 and attaching flange 61.

The spacing between the opposing and spaced faces of the end wall 60 and retainer ring 54 is such that these faces closely embrace the guide flange 56 on the stator blade carrier assembly 21 but still allow such flange to have radial movement relative to the wall 60 and ring 54. Thus the stator blade carrier assembly 21 as a whole, while being maintained in the desired axial position relative to the rotor 12, is free to enlarge or contract due to varying thermal conditions and maintain concentricity of the outer end ring 34 with respect to the rotor blade tips 23.

From the foregoing, it will be seen that the present invention provides a simple, easy, accurate, and quick way of mounting a stator blade carrier assembly in juxtaposition and concentric relation to a turbine rotor. Should the stator blade carrier assembly be required to be dismounted for repair or replacement, this can be readily done by reversing the assembling procedure previously described. In this connection, should a different stator blade carrier assembly be used as a replacement, the guide blocks on the new carrier assembly, which at least as to some may have a different circumferential orientation from those on its predecessor, presents no problem since the same procedure previously described can be followed for accurately positioning and mounting the new carrier assembly, including the drilling of new holes in the hot ring while still using the first set of key members.

What is claimed is:

1. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and a plurality of circumferentially spaced support means operatively interposed between said carrier assembly and ring member for mounting the former on the latter, said support means including a first guide means fast to said ring member and a second guide means fast to said carrier assembly, said first and second guide means cooperating to permit relative movement therebetween in a direction radial to the rotor axis, said ring member constituting the sole support for said carrier assembly.

2. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and means for mounting said carrier assembly solely on said ring member and comprising a plurality of circumferentially spaced first guide means fast to said carrier assembly, means providing an annular groove in said ring member, a second guide means for each of said first guide means and having an element received in said groove and supporting said second guide means against movement relative to said ring member in a direction radial to the rotor axis, and means securing said second guide means to said ring member against circumferential movement relative to said groove, each corresponding pair of said first and second guide means cooperating to permit relative movement therebetween in a direction radial to said rotor axis.

3. In a turbine, the combination comprising a bladed rotor, a stationary ring member surrounding said rotor, a stator blade carrier assembly arranged adjacent said rotor and including an annular continuous ring surrounding the said rotor in closely spaced and concentric relation to the tips of the blades thereof, and means for mounting said carrier assembly solely on said ring member and comprising a plurality of circumferentially spaced first guide means fast to said carrier assembly, means providing an annular groove in said ring member, a second guide means for each of said first guide means and having an element received in said groove and supporting said second guide means against movement relative to said ring member in a direction radial to the rotor axis, means securing said second guide means to said ring member against circumferential movement relative to said groove, and means arranged to prevent relative movement between said first guide means and said ring member in a direction axial of said rotor axis, each corresponding pair of said first and second guide means having guide surfaces cooperating to permit relative movement therebetween in a direction radial to said rotor axis.

4. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and means for mounting said carrier assembly solely on said ring member and comprising a plurality of circumferentially spaced slotted blocks fast to said carrier assembly, means providing an axially facing annular groove in said ring member, a key member for each of said blocks and having a tongue element received in said groove and also having a rib element projecting radially inwardly toward the rotor axis and slidably received in the corresponding one of said slotted blocks, and means securing said key members to said ring member against circumferential movement relative to said groove, each corresponding pair of said blocks and key members having guide surfaces cooperating to permit relative movement therebetween in a direction radial to said rotor axis.

5. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and means for mounting said carrier assembly solely on said ring member and comprising a plurality of circumferentially spaced blocks fast to said carrier assembly and each having a radially extending guide surface, means providing a pair of axially and radially spaced axially facing annular grooves in said ring member, a key member for each of said blocks and having axially and radially spaced axially projecting tongue elements received severally in said grooves and also having a radially extending guide surface, and means securing said key members individually to said ring member against circumferential movement relative to said grooves, said guide surfaces of each corresponding pair of said blocks and key members overlapping and cooperating to permit relative movement therebetween in a direction radial to the rotor axis.

6. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and means for mounting said carrier assembly solely on said ring member and comprising a plurality of circumferentially spaced blocks fast to said carrier assembly and each having a radially extending guide surface, means providing a pair of axially and radially spaced axially facing annular grooves in said ring member, a key member for each of said blocks and having axially and radially spaced axially projecting tongue elements received severally in said grooves and also having a radially extending guide surface, and a pin and recess connection between each of said key members and said ring member to maintain the circumferential positions of said key members on said ring member, said guide surfaces of each corresponding pair of said blocks and key members overlapping and cooperating to permit relative movement therebetween in a direction radial to the rotor axis.

7. In a turbine, the combination comprising a bladed rotor, a stationary ring member surrounding said rotor, a stator blade carrier assembly arranged adjacent said rotor and including an annular continuous ring surrounding said rotor in closely spaced and concentric relation to the tips of the blades thereof, and means for mounting said carrier assembly solely on said ring member and comprising a plurality of circumferentially spaced slotted blocks fast to said carrier assembly, means providing an axially facing annular groove in said ring member, a key member for each of said blocks and having a tongue element received in said groove and also having a rib element projecting radially inwardly toward the rotor axis and slidably received in the corresponding one of said slotted blocks, means securing said key members to said ring member against circumferential movement relative to said groove, each corresponding pair of said blocks and key members having guide surfaces cooperating to permit relative movement therebetween in a direction radial to said rotor axis, means arranged to prevent relative movement between said key members and said ring member in a direction axial of said rotor axis, and means arranged to prevent relative movement between said carrier assembly and said ring member in a direction axial of said rotor axis.

References Cited in the file of this patent

UNITED STATES PATENTS

| | | |
|---|---|---|
| 2,427,244 | Warner | Sept. 9, 1947 |
| 2,488,867 | Judson | Nov. 22, 1949 |
| 2,488,875 | Morley | Nov. 22, 1949 |
| 2,605,997 | Lombard et al. | Aug. 5, 1952 |
| 2,625,013 | Howard et al. | Jan. 13, 1953 |
| 2,628,067 | Lombard | Feb. 10, 1953 |
| 2,634,090 | Hardigg | Apr. 7, 1953 |
| 2,640,319 | Wislicenus | June 2, 1953 |
| 2,654,566 | Boyd et al. | Oct. 6, 1953 |
| 2,838,275 | Harris et al. | June 10, 1958 |
| 2,903,237 | Petrie et al. | Sept. 3, 1959 |
| 2,910,269 | Haworth et al. | Oct. 27, 1959 |
| 2,982,519 | Haworth et al. | May 2, 1961 |